United States Patent [19]

Gotou et al.

[11] Patent Number: 4,687,418
[45] Date of Patent: Aug. 18, 1987

[54] DEVICE FOR MAKING A FLUID HAVING ELECTRICAL CONDUCTIVITY FLOW

[75] Inventors: Tadashi Gotou, Hitachi; Hisashi Yamamoto, Katsuta, both of Japan

[73] Assignee: Hitachi, Ltd., Tokyo, Japan

[21] Appl. No.: 756,669

[22] Filed: Jul. 19, 1985

[30] Foreign Application Priority Data

Jul. 20, 1984 [JP] Japan ................... 59-149527
Jul. 20, 1984 [JP] Japan ................... 59-151585

[51] Int. Cl.⁴ .................. H02K 44/00; H02K 44/08
[52] U.S. Cl. ........................................ 417/50; 310/11
[58] Field of Search ........................... 417/50; 310/11

[56] References Cited

U.S. PATENT DOCUMENTS

| 2,715,190 | 8/1955 | Britt | 417/50 |
| 2,770,196 | 11/1956 | Watt | 417/50 |
| 3,260,209 | 7/1966 | Rhudy | 417/50 |
| 4,287,444 | 9/1981 | Popov | 417/50 |
| 4,392,786 | 7/1983 | Merenkov et al. | |
| 4,412,785 | 11/1983 | Roman | 417/50 |
| 4,469,471 | 9/1984 | Keeton | 417/50 |

FOREIGN PATENT DOCUMENTS

| 555413 | 7/1932 | Fed. Rep. of Germany | |
| 1228403 | 12/1961 | France | 417/50 |
| 2438894 | 9/1980 | France | |
| 723570 | 2/1955 | United Kingdom | 310/11 |
| 873807 | 7/1961 | United Kingdom | 417/50 |
| 782689 | 1/1982 | U.S.S.R. | 310/11 |

OTHER PUBLICATIONS

Nuclear Energy, vol. 20, No. 1, Feb. 1981, pp. 79-90, London, GB; D. F. Davidson, et al.

Primary Examiner—Carlton R. Croyle
Assistant Examiner—Donald E. Stout
Attorney, Agent, or Firm—Antonelli, Terry & Wands

[57] ABSTRACT

A device for flowing a fluid having electrical conductivity comprises a plurality of fluid passages annularly arranged such that electric current can flow across the adjacent passages and a magnetic field generating means for generating a magnetic flux crossing the plurality of passages in radial direction. The electric current induced by making the electrically conductive fluid flow in part of the fluid passages is caused to flow in loop through all the fluid passages. The electrically conductive fluid existing in the remaining fluid passages is caused to flow by the induced current and the magnetic flux produced in the magnetic field generating means, in synchronism with the flow of the fluid flowing through said part of the fluid passages.

2 Claims, 19 Drawing Figures

DEVICE FOR MAKING A FLUID HAVING ELECTRICAL CONDUCTIVITY FLOW

BACKGROUND OF THE INVENTION

The present invention relates to a device for making a fluid having electrical conductivity flow.

Figure 1:
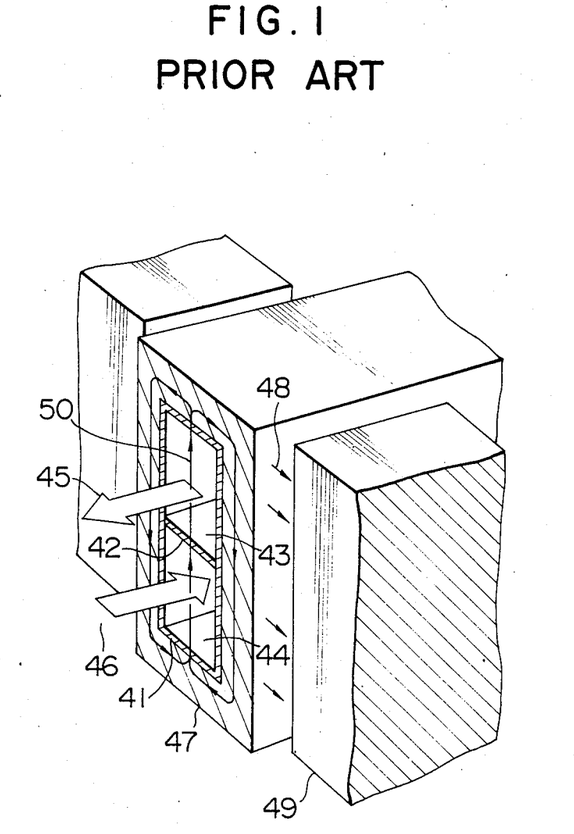
FIG. 1 is a perspective sectional view of a conventional electromagnetic flow coupler.

A prior art electromagnetic flow coupler has been proposed which includes rectangular duct 41 with a partitioning plate 42 so that two separate fluids having electrical conductivity may flow therethrough, i.e., so as to form two ducts one of which is a primary duct 43 and the other of which is a secondary duct 44. A driving fluid 45 and a driven fluid 46 are caused to respectively flow through the primary duct 43 and the secondary duct 44. The outer surface of the rectangular duct 41 is enclosed by an electrode 47 formed of good electrical conductor, whereby both ducts 43, 44 are constructed into a current circuit. At both sides of the rectangular duct 41, there are provided a pair of magnets 49 so that a common magnetic field 48 is imparted to both the driving fluid 45 and the driven fluid 46.

When the driving fluid 45 flows through the primary duct 43 by an external force, a current 50 is induced in the driving fluid 45 in accordance with the Fleming's right-hand rule in a direction perpendicular to the direction of the magnetic field 48 and the flowing direction of the driving fluid, respectively. The electric current 50 thus induced is supplied to the driven fluid 46 existing in the secondary duct 44 by passing through the electrode 47 provided on the outer peripheral surface of the rectangular duct 41. In the driven fluid 46 thus supplied with the current, a pumping force is produced in accordance with the Fleming's left-hand rule in a direction perpendicular to the directions of the magnetic field 48 and the supplied current, respectively. When the common magnetic field 48 and the current 50 are respectively oriented in the above-mentioned directions, the driving fluid 45 and the driven fluid 46 flow in mutually opposite directions as shown in FIG. 1 by enlarged white arrows.

Figure 2:
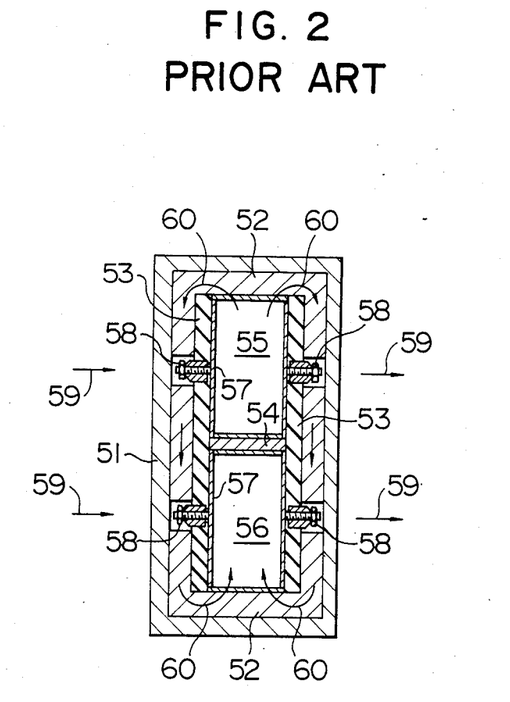
FIG. 2 is a sectional view of a conventional electromagnetic flow coupler shown in Japanese Patent Unexamined Publication No. 10163/84.

An electromagnetic flow coupler disclosed in a Japanese Patent Unexamined Publication No. 10163/1984, shown in FIG. 2, is known as an example of the electromagnetic flow coupler having a structure based on the above-mentioned principle.

The conventional electromagnetic flow coupler of FIG. 2 has an outer duct 51 made of stainless steel such as SUS 316 in order to obtain a mechanical strength of the duct 51 and, at the same time, prevent the leakage of liquid metal. A duct 52 made of material having electrical conductivity such as copper is provided, as an electrode, inside the outer duct 51. Further, an insulating member 53 including alumina plate is provided at each side of electrode in order to prevent electricity from leaking from a portion thereof. At a substantially central portion of the inside duct 52, an electrically conductive isolation plate 54 is disposed vertically with respect to the insulating member 53 on each side of the inside duct 52 so as to form two adjacent separate fluid passages, i.e., first fluid passage 55 and a second fluid passage 56.

The surfaces of the first and second fluid passages 55, 56 which contact with the fluid are applied with inner linings 57 include thin stainless steel plates in order to prevent the corrosion of the insulating members 53 and relevant portions of the inside duct 52. The inside duct 52, insulating members 53 and inner linings 57 are fixed by bolts, nuts, ribs, etc.

When magnetic fields are formed in the direction indicated by arrows 59, the liquid metal, for example, sodium, which flows through the first fluid passage 55 by the action of, for example, an external pump (not shown), has a current induced therein in a direction perpendicular to the flowing direction of the sodium as well as to the direction of the magnetic field. Accordingly, the first fluid passage 55 causes a D.C. power generating function, and the resultant induced current flows out from a top thereof, flowing back into a bottom of the second fluid passage 56, as indicated by arrows 60. Since the side walls of the fluid passages 55, 56 are electrically insulated almost as a whole by the insulating members 53, the induced current flows through the second fluid passage 56. In the fluid inside the second fluid passage 56, a force is produced in a direction perpendicular to the flowing direction of the induced current and the acting direction of the magnetic field, with the force serving as a pumping force for causing a flowing of the liquid sodium in the second passage 56.

As shown in FIG. 2, it is necessary to provide a bus bar electrode to enclose the duct in order to supply a low-voltage/large-current induced in the first passage 56, 55 to the second passage for using it in the form of a driving current which permits the second passage 56 to act as a pumping section. Besides, the insulating member is required to be provided on both sides of the duct in order to obtain a larger amount of orthogonal component current effective to produce the pumping force and to prevent the leakage of electricity from the electrode portion through the duct wall. With the above-mentioned construction, the arrangement functions as an electromagnetic flow coupler, in principle. However, where the fluid is, for example, sodium, corrosion prevention measures should be taken with respect to the insulating members or bus bar portions. In this view, in the conventional arrangement shown in FIG. 2, the inner linings consisting of stainless steel plate (SUS plate) are applied onto the inner surface of the duct.

As stated above, the prior art electromagnetic flow coupler has a complicated structure including the means of attaching the respective constituent elements. Further, when viewed from the aspect of performance, the low-voltage/large-current flow path has a structure wherein the joining portion between the inner linings and bus bar has an increased electrical contact resistance. Furthermore, in the prior art, no consideration is given to the power dissipation due to the short-circuit current at the electrode portions which does not serve as a pumping power.

It has been determined that such electromagnetic flow coupler can be utilized as a flowing means used when the fluids in the passages of a two-flow system simultaneously flow in opposite directions as in case of a liquid sodium heat exchanger arranged to transfer heat from the passage of one flow to the passage of the other flow.

Figure 3:
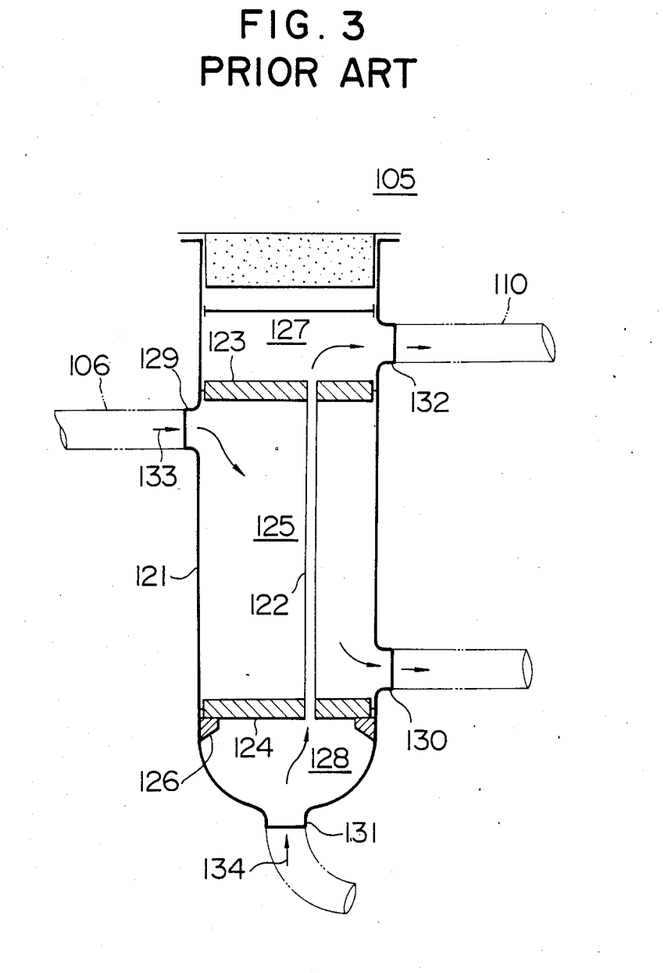
FIG. 3 is a sectional view of a conventional shell-and-tube type intermediate heat exchanger.

A conventional liquid sodium heat exchanger as shown in FIG. 3, is a shell-and-tube type heat exchanger, which is among the heat exchangers disclosed in "Liquid Metal Handbook (Sodium and Nak Supplement)" 1967-6 published by a United States LMEC.

Figure 4:
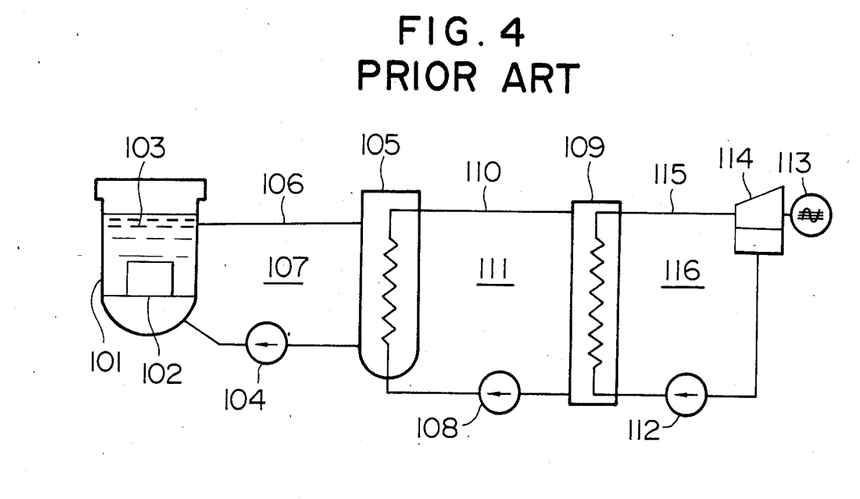
FIG. 4 is a diagram showing a prior art cooling system of a fast breeder reactor.

The illustrated type of heat exchanger is used for transferring heat from a primary cooling section to a secondary cooling section incorporated in a fast breeder reactor (hereinafter, referred to simply as "fast breeder") constituting a nuclear reactor. As shown in FIG. 4, the cooling system of the fast breeder includes a primary cooling section, secondary cooling section and steam generating section. Within a reactor vessel 101, a reactor core 102 is disposed and a primary coolant 103 such as liquid sodium, an electrically conductive fluid, is filled. The reactor vessel 101 is provided at its bottom with an inlet nozzle and at its top with an outlet nozzle. The inlet nozzle portion is connected with a pump for the primary cooling section while the outlet nozzle portion is connected with an intermediate heat exchanger 105 through a pipe 106, to form the primary cooling section 107. On the secondary side of the intermediate heat exchanger 105, a pump 108 for the secondary cooling section is connected thereto and a steam generator 109 is also connected through a pipe 110, to form the secondary cooling section 111. On the secondary side of the steam generator 109, there is connected a water feeding pump 112 as well as a steam turbine 114 directly connected with a power generator 113 through a pipe line 115, to form the steam generating section 116. The heat generated from the reactor core 102 is transferred by the coolant 103 flowed by operation of the pump 104, toward the intermediate heat exchanger 105. In the secondary cooling section 111, the heat of the intermediate heat exchanger 105 is transferred toward the steam generator 109 by operation of the pump 108. The steam generator 109 heats the water from the water feeding pump 112 by the heat thus transferred, into a superheated steam which is then fed to the steam turbine 114 to drive the same, to thereby rotate the power generator 113 so as to abtain electricity from the generator 113.

In the above-mentioned cooling system, since the primary cooling section circulates the radioactive coolant, the heat from the reactor core 102 is once transferred, for ensuring safety, to the non-radioactive coolant in the intermediate heat exchager 105 of the secondary cooling section 111 and thereafter a superheated steam is obtained as mentioned above.

As shown in FIG. 3, a shell-and-tube type heat exchanger includes a plurality of heat transfer tube 122 disposed within the cylindrical shell 121 and supported between an upper tube sheet 123 and a lower tube sheet 124 to form a bundle of tubes 125. This bundle of tubes 125 is supported by a support means 126 provided inside the shell 121. An upper plenum 127 and a lower plenum 128 are thus provided on the upper tube sheet 123 and under the lower tube sheet 124, respectively.

At the upper portion of the shell 121 falling within a zone where the bundle of tubes 125 is provided, a primary inlet nozzle 129 is provided, and, at the lower portion thereof, a primary outlet nozzle 130 is provided. A secondary inlet nozzle 131 is provided at the lower plenum 128 while a secondary outlet nozzle 132 is provided at the upper plenum 127. In the intermediate heat exchanger 105 having the above-mentioned construction, a heating fluid 133 is introduced from the primary inlet nozzle 129 by an external pump and passes over the outer peripheries of the heat transfer tubes 122 and then flows out from the primary outlet nozzle 130. On the other hand, the fluid 134 to be heated is introduced from the secondary inlet nozzle 131 by pump and is allowed to flow into the heat transfer tubes 122 from the lower plenum 128, flowing through the interiors of the heat transfer tubes 122 to join together into the upper plenum 127. Thus, the fluid flows out from the secondary outlet nozzle 132. Accordingly, in the area of the bundle of heat transfer tubes 125, the flow of heating fluid 133 and the flow of fluid 134 to be heated are opposite in direction to each other with the heat transfer walls intervening in between, whereby heat exchange is effected between both fluids 133 and 134.

As stated above, in order to operate the prior art intermediate heat exchanger, it is necessary to provide the primary and secondary pumps (104, 108) as supplementary instruments. Since the radioactive fluid flows in the primary cooling section, the machinery used therein is very difficult to maintain. High reliability, therefore, is demanded of the machinery in this regard. The pumps 104, 108 of mechanical system in particular contain rotary parts, for which reason they are most likely to cause an accident. A simple arrangement which eliminates the necessity of having such machinery is desirable. In the prior art, however, the use of both pumps 104 and 108 is inevitable.

It has been found that where a primary coolant is made to flow through one duct of electromagnetic flow coupler with a secondary coolant being made to flow through the other duct thereof, when only one of the two coolants is made to flow by a pump, the other coolant is caused to flow without using a separate pump to enable a heat exchange between both coolants. In this case, however, it is necessary to efficiently utilize the current induced in the power generating section of the electromagnetic flow coupler, as the pumping power therefor.

SUMMARY OF THE INVENTION

The object of the present invention is to provide a structure having a section functioning as an electric generator and a section functioning as an electromagnetic pump, in which both sections are combined so that the current induced in the electric generator section may be efficiently utilized as the pumping power.

To attain the above object, according to the invention, there is provided a device for making a fluid having electrical conductivity flow comprising a plurality of fluid passages annularly arranged such that electric current can flow across the adjacent passages and a magnetic field generating means for generating magnetic flux crossing said plurality of passages in radial direction.

DESCRIPTION OF THE PREFERRED EMBODIMENTS

Figure 5:
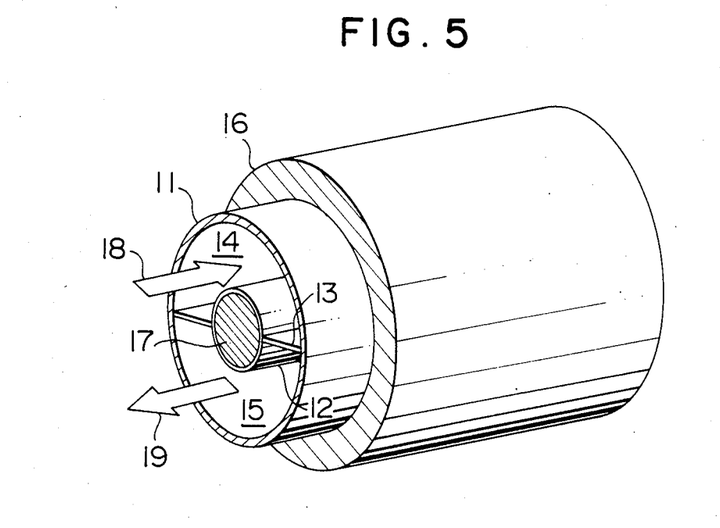
FIG. 5 is a perspective sectional view of a flowing device of a first embodiment of the invention.

As shown in FIG. 5, a flowing device of a first embodiment of the invention includes a cylindrical-tube like inside duct 12 provided at the central part of a cylindrical-tube like outside duct 11, with the ducts 11, 12 being preferably formed as stainless steel tubes having a high resistance to corrosion because they are directly contacted by a liquid metal. By disposing the inside and outside 12, 11 as mentioned above, an annular fluid passage is formed. Partitioning plates are provided at the substantially central portions of the annular passage to form a first fluid passage 14 and a second fluid passage 15, through which two separate fluids respectively flow. The partioning plates 13 may also preferably be made of stainless steel plate of the same quality as that of the material constituting the ducts 11 and 12. The partitioning plates 13 function not only as means for ensuring the respective configurations of the separate ducts 11 and 12 but also as supporting means for supporting the inside duct 12 at the central part of the outside duct 11. The partitioning plates 13 preferably are joined to the ducts 11 and 12 by a general electric welding.

A cylindrical outside magnet 16 is provided on the outer periphery of the outside duct 11, with N and S polarities being arranged in the axial or longitudinal direction on the ducts 11, 12. A bar-like iron core 17 is inserted, as magnetic material, into the inside duct 12.

The flowing device in accordance with embodiment of FIG. 5 is connected to a midway portion of, for example, a pipe line arranged in a liquid metal plant. In this arrangement, when a driving fluid 18 flows through the first fluid passage 14 by, for example, a pump, another liquid metal existing in the second fluid passage 15 flows in a direction opposite to the flowing direction of the driving fluid to become a driven fluid 19.

Figure 6:
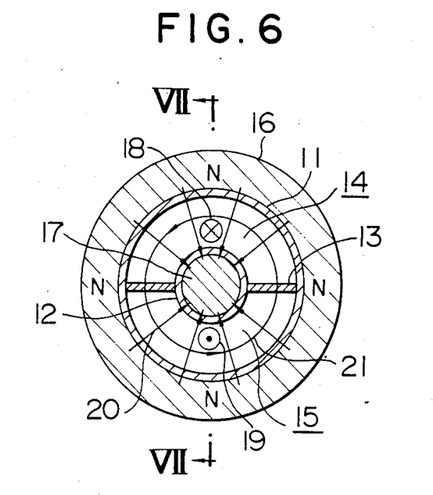
FIG. 6 is a sectional view of the flowing device shown in FIG. 5.

As shown in FIG. 6, the annular fluid passage is formed by the outside duct 11 and inside duct 12 and is divided into two passages, i.e., the first fluid passage 14 and the second fluid passage 15, by the partitioning plates 13. By providing the cylindrical magnet 16 on the outer periphery of the outside duct 11 and the iron core 17 in the inside duct 12, a magnetic flux 20 is produced, over the entire circumference of the annular fluid passage, between the magnet 16 and the iron core 17. When in FIG. 6 the polarity of the magnet 16 is assumed to be (N), the magnetic flux 20 is generated from the magnet 16 toward the iron core 17.

Figure 7:
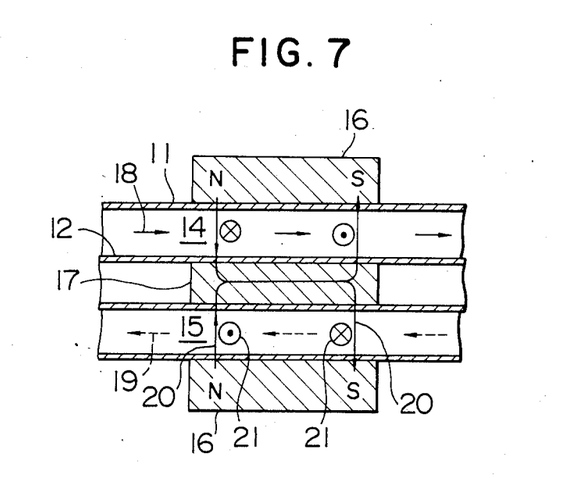
FIG. 7 is a sectional view taken along the line VII—VII of FIG. 6.

If the magnet 16 is such that it has N polarity on the left side and S polarity on the right side in FIG. 7, the magnetic flux 20 is generated, on the left side, from the magnet 16 toward the iron core 17 and, on the right side, from the iron core 17 toward the magnet 16. Accordingly, the resultant magnetic circuit forms a magnetic loop wherein the magnetic flux 20, generated from the magnet 16, radially passes across the annular fluid passage, axially passes through the central iron core 17, then passes across the annular fluid passage in the opposite direction, and returns to the magnet 16.

When the driving fluid 18 flows through the first fluid passage 14 of the annular fluid passage by an external force such as, for example, a pumping force, an electric current is induced within the driving fluid 18 in a direction perpendicular to the direction of the aforementioned magnetic fluid 20. Since the magnetic flux is radially distributed, the orthogonal components of local induced current are produced in a direction tangential to the annular fluid passage. A composite current, taken over the entire circumference of the annular fluid passage, describes a circle as shown in FIG. 6, to become a loop current 21 coaxial with the annular fluid passage. Since the magnet 16 has different polarities in the axial direction, the magnetic flux density becomes maximum at both ends thereof and becomes zero at the center thereof. Further, with the direction being magnetic flux at one end of opposite to that of magnetic flux at the other end. Accordingly, the direction of the loop current at one end is also opposite to that at the other end. When the loop current 21 is supplied to the electrically conductive fluid existing in the second fluid passage 15, this fluid is imparted with a force acting in a direction perpendicular to the afore-mentioned direction of the magnetic flux 20 and the afore-mentioned direction of the loop current 21. Although the directions of the magnetic flux 20 and loop current 21 at both axial ends are opposite, the directions of the forces produced in accordance with the Fleming's left-hand rule as the same. Further, the magnitude of such forces maximum at the axial ends, decreases toward the center, and is zero at the center. However, the driven fluid 19 is caused to flow by such forces accumulated in the entire region as taken in the axial or longitudinal direction of the ducts 11 and 12. In this way, in the flowing device of annular fluid passage type, when a liquid metal flows through the first fluid passage 14 by using an external force such as a pumping force, a loop current is produced to cause a liquid metal in the second fluid passage 15 to automatically flow in the opposite direction to that of the liquid metal in the first fluid passage 14 without adding such an external force to the liquid metal in the second passage 15.

As apparent from the above description, since the induced current circulates through the liquid metal in the form of a loop current 21, there is no need to adopt a special electrode structure whose electrode encloses the duct 11 for providing a current path for permitting the passage of the induced current. That is, the induced current can efficiently be utilized as means for making the liquid metal flow in the second fluid passage 15 without providing any special electrode structure. Therefore, the embodiment of FIG. 6 can provide a liquid-metal driving or flowing means which is simple in constructon and yet high in driving efficiency.

Figure 8:
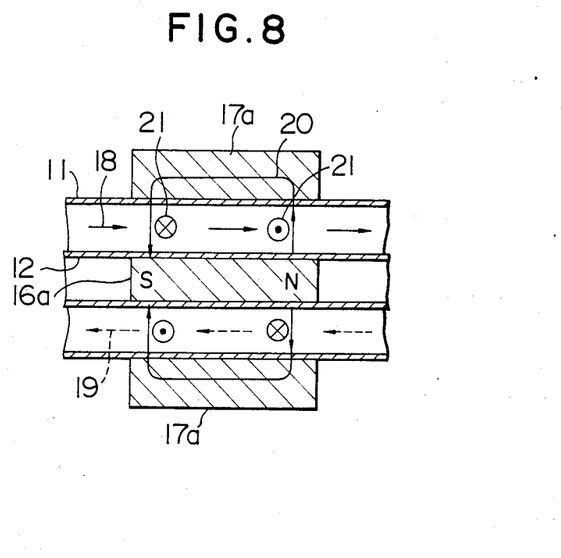
FIG. 8 is a sectional view of a flowing device of a second embodiment of the invention.

The embodiment of FIG. 8 is directed to a partial modification of the preceding embodiment and differs from the first embodiment in that a rod-like magnet 16a is inserted into the inside duct 12 and a cylindrical iron core 17a is provided, as magnetic material, on the outer periphery of the outside duct 11. In the embodiment of FIG. 8, since the magnetic flux 20 and the loop current 21 are obtained as in the first embodiment, when the driving fluid 18 flows, the driven fluid 19 can be caused to flow in the opposite direction to that of the driving fluid 18.

Figure 9:
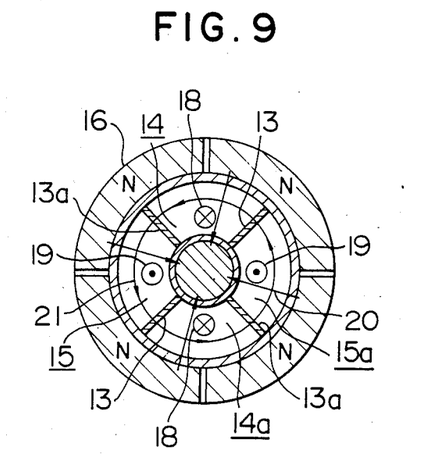
FIG. 9 is a sectional view of a flowing device of a third embodiment of the invention.

In the third embodiment of FIG. 9 the first and second passage 14, 15 of the preceding first embodiment are modified by additionally providing a partitioning plate 13a in the structure in accordance with the first embodiment, to thereby provide a pair of first fluid passages 14, 14a and a pair of second fluid passages 15, 15a. In addition to the effects obtained in the first embodiment, the embodiment of FIG. 9 has the effect that, as the portions where current is induced are distributed, a uniform output density is obtained.

Figure 10:
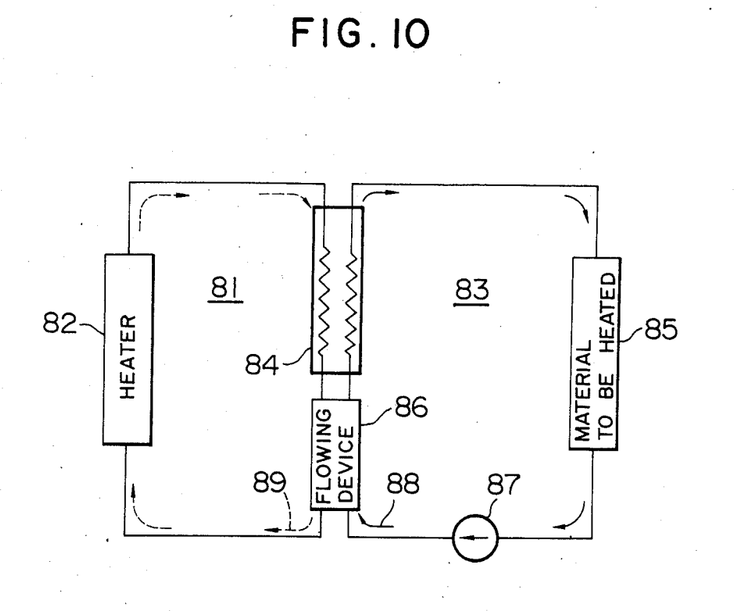
FIG. 10 shows a fourth embodiment of the invention and is a view of flow system of a heat exchanger, illustrating an example of utilizing the flowing device in accordance with any one of the above-mentioned embodiments.

The flowing device according to the invention can be used, for example, in such a manner as in a fourth embodiment shown in FIG. 10. As shown in FIG. 10, a heat transfer loop, using liquid sodium as a heating material, transfers heat in a heater 82 of a primary loop 81 to a secondary loop 83 by way of a heat exchanger 84 to thereby heat a material to be heated in the secondary loop 83. In this case, the secondary loop 83 is communicated with the first fluid passage 14 or the pair of first fluid passages 14, 14a of the flowing device 86 and the primary loop, 81 is communicated with the second fluid passage 15 or the pair of second fluid passages 15, 15a thereof. When, under this arrangement, a pump 87 of the secondary loop 83 is driven to operate, a flow 88 occurs in the secondary loop 83. At this time, the above-mentioned loop current is induced in the flowing device 86, so that a flow 89 in the primary loop is obtained. By using the flowing device 86 in the foregoing heat transfer loop system, it is possible to omit from the primary loop any pump means which is difficult to maintain, and to make the fluid in the primary loop 81 flow only by the use of the pump 87. Further, by utilizing the partitioning plates 13, 13a as heat transfer wall surfaces, it is possible to effect the heat exchange inside the flowing device as well.

Figure 11:
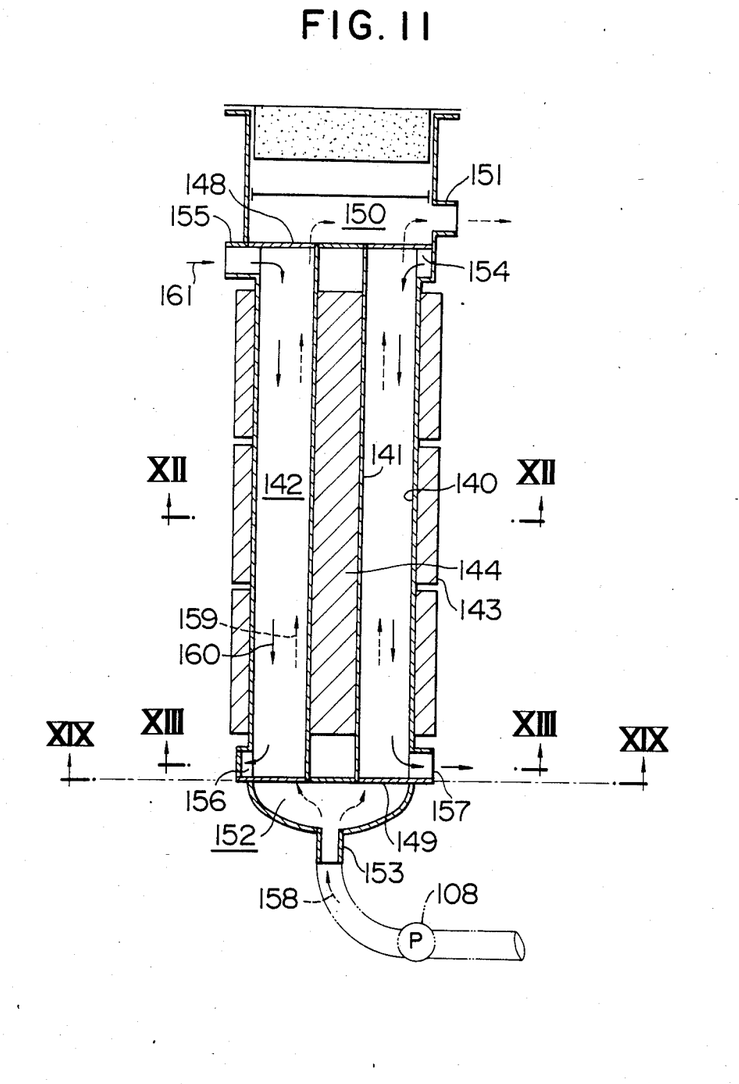
FIG. 11 shows a fifth embodiment of the invention and is a sectional view of a heat exchanger in which the flowing device is incorporated.

The embodiment of FIG. 10 is directed to an example wherein the flowing device is used in a manner that it is disposed in series with the eat exchanger; however, in a fifth embodiment shown in FIG. 11 the flowing device is incorporated into a heat exchanger.

Figure 12:
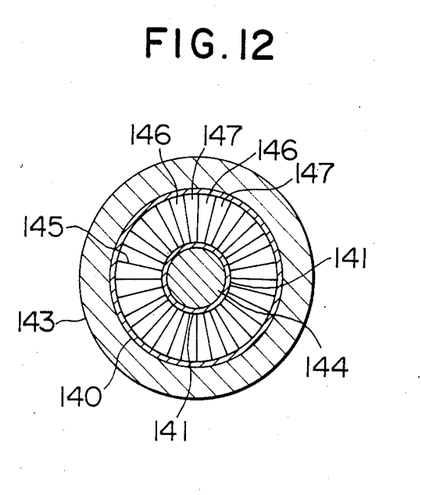
FIG. 12 is a sectional view of the heat exchanger taken along the line XII—XII of FIG. 11.
Figure 19:
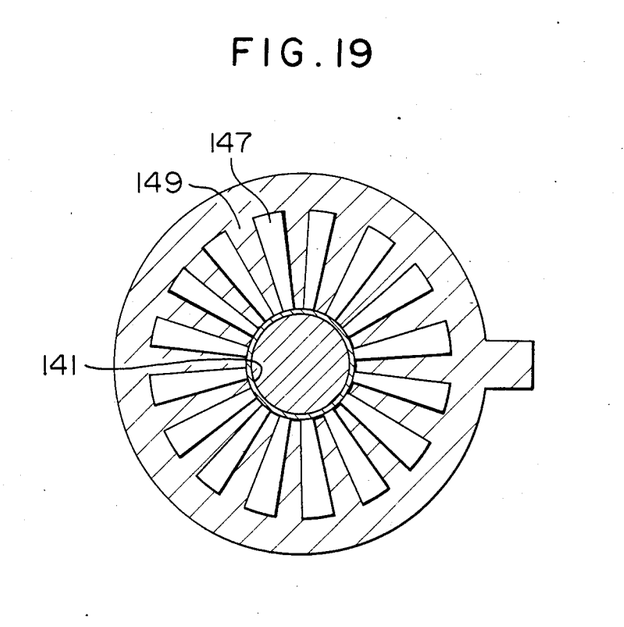
FIG. 19 is a cross-sectional view taken along the line XIX—XIX in FIG. 11.

More particularly, as shown in FIG. 11, a hollow inner cylinder 141 is disposed at a central part of an outer cylinder 140 so as to form an annular fluid passage 142. A plurality of cylindrical magnets 143 are provided on the outer periphery of the outer cylinder 140 in such a manner that they are disposed in several stages in the axial direction. A bar-like iron core 144 is disposed within the inner cylinder 141 so as to form a magnetic field generating circuit. In the embodiment of FIG. 11, the magnetic field generating circuits are, for example, formed in three stages in the axial direction. As shown in FIG. 12, a plurality of electrically conductive partitioning plates 145 are radially provided in the annular fluid passage 142 to alternately form primary fluid passages 146 and secondary fluid passages 147. As shown in FIG. 11, a top plate 148 and a bottom plate 149 are respectively provided at the upper and lower ends of the outer cylinder 140 to thereby fix the partitioning plates 145. The partitioning plates 145 are fixed to the top plate 148 and bottom plate 149 such that either the primary fluid passages 146 or the secondary fluid passages 147 extend through the top plate 148 and bottom plate 149. In the embodiment of FIG. 12, the top and bottom plates 148, 149 are formed with openings at the portions corresponding to the secondary fluid passages 147, as shown in FIG. 19, so that only the secondary fluid passages 147 pass through the plates 148 and 149. On the top plate 148 an upper plenum 150 is provided which opens to a secondary outlet nozzle 151. Under the bottom plate 149 a lower plenum 152 is provided which is communicated with a secondary inlet nozzle 153. An upper jacket 154 is provided immediately beneath the top plate 148 to communicate the same with a primary inlet nozzle 155. A lower jacket 156 is provided immediately above the bottom plate 149 to communicate the same with a primary outlet nozzle 157. The secondary fluid passages 147 are closed with respect to the lower jacket portion 156 so that only the primary fluid passages 146 may communicate therewith.

A secondary fluid 158 (FIG. 11), constituted by liquid sodium, is caused to flow from the secondary inlet nozzle 153 into the lower plenum 152 by external force such as, for example, a pump 108, so as to flow into each secondary fluid passages 147. Each flow of the secondary fluid 158 rises through its corresponding secondary fluid passages 147 in the form of an upward flow 159, joining together in the upper plenum 150 to flow out from the secondary outlet nozzle 151. In the course of the upward flow 159, the pumping function of the flowing device is rendered effective to automatically impart a flowing force to primary fluids 161 in the primary fluid passages which are constituted by liquid sodium, thereby making the primary fluids 161 flow downwardly in the form of a downward flow 160. That is, the primary fluid 161 is caused to enter from the primary inlet nozzle 155 and, in the zone of downward flow 160, heat exchange is effected between this primary fluid 161 and the secondary fluid 158 constituting the upward flow 159 by way of the partitioning plates 145 used as heat transfer wall surface. Then, the primary fluid 161 flows out from the primary outlet nozzle 157. Thus, an electromagnetic flow coupler type heat exchanger is established.

Figure 14:
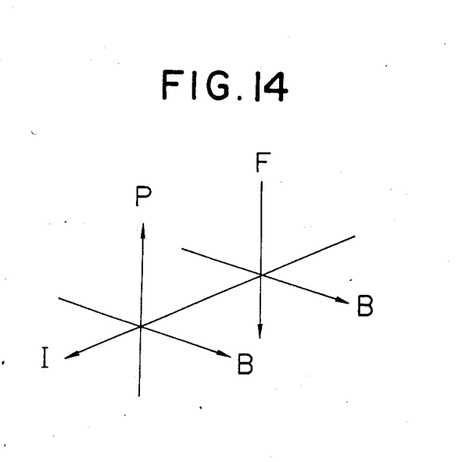
FIG. 14 is a vector diagram showing the basic relationship among three factors, magnetic field, induced current and forces involved, which is utilized in the present invention.

As shown in FIG. 14, when a force F is applied to a common magnetic field B from a direction perpendicular thereto, an electric current I is induced at right angles to the magnetic field B and the acting direction of the force F in accordance with the Fleming's right hand rule. In a conductor falling under the effective area of the magnetic field to which the induced current I has been applied, a force P is produced in a direction perpendicular to the current I and magnetic field B in accordance with the Fleming's left hand rule. Accordingly, an electromagnetic flow coupler is established wherein application of an external force such as the pumping force of, for example, a secondary pump to one of two conductors in the area of a common magnetic field causes a secondary force to be produced in the other conductor in the opposite direction.

Figure 15:
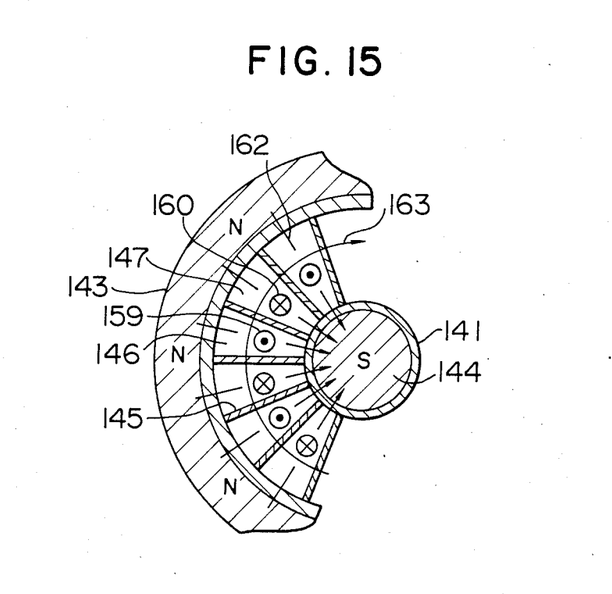
FIG. 15 is a partially fragmented view of FIG. 12 in which the vector relationship of FIG. 14 is applied.

In FIG. 15, for the sake of convenience, magnetic polarity of an outer-peripheral magnet 143 is assumed to be "N" and the magnetic polarity of a central iron core 144 is assumed to be "S". Accordingly, magnetic flux 162 exists radially from the outer peripheral area toward the central iron core 144. The fluid passage is divided into a plurality of sections by the partitioning plates 145 in such a manner that the primary fluid passages 147 and secondary fluid passages 146 are alternately arranged. Assuming that the secondary fluid is caused to rise through the secondary fluid passages 146, as indicated (FIG. 15) by marks ●, by an external force, for example, imparted from the secondary pump 108, then an electric current is induced which is proportionate to the velocity of fluid flow in each secondary fluid passages 146 which electric currents are summed, so that a loop current 163 is formed coaxially with the annular passage. The electrically conductive fluid such as, for example, liquid sodium, in the primary fluid passages 147 adjacent to the secondary fluid passages 146 is acted upon by the loop current 163 in the effective area of the magnetic flux 162. As a result, a flowing force is produced in the form of downward flows 160 (FIG. 15) ⊗ occurring in a direction opposite to that of the secondary fluid. The flowing forces produced in the primary fluid passages 147 are added to become a pumping force with respect to the primary fluid 161 as a whole.

Figure 16:
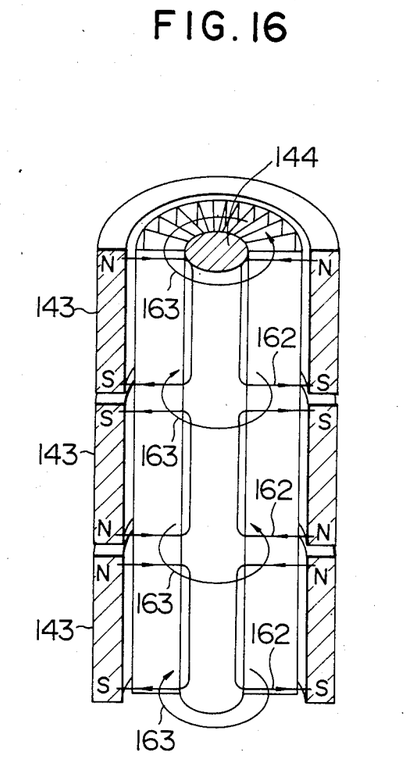
FIG. 16 is a perspective sectional view showing the relationship between the magnetic field and induced current which is applied to the heat exchanger shown in FIG. 11.

In the fifth embodiment of FIG. 16, the magnets 143 are provided in three stages in the axial direction. As shown, by arranging the polarities in the form of N-S, S-N and N-S, the directions of the magnetic fluxes are formed. Accordingly, the axial distribution of magnetic flux exhibit maximum magnetic flux density at the magnetic poles and the directions of the magnetic flux alternate. When a driving fluid in the annular fluid passage flows, loop electric currents 163 are induced in such a manner that they are maximum at each magnetic pole. These loop electric currents 163 are induced such that their directions are opposite to each other at the portions providing maximum magnetic flux density. However, since the directions of the magnetic field 162 and loop electric currents 163 are opposite to each other, a direction of the force is not varied. Accordingly, the pumping force in the electromagnetic flow coupler is produced over the axial direction.

In this manner, an electromagnetic flow coupler type heat exchanger is formed in such a manner that the heat transferring action is effected over all the walls of the partitioning plates 145 and the pumping action is also effectively performed.

According to this embodiment, by making the fluid passages of the electromagnetic flow coupler into annularly arranged fluid passages, respective directions of magnetic field, electric current and fluid, and the directions of fluid flow and heat flow at the time of heat exchange satisfy the operational principle the electromagnetic flow coupler and the heat exchanger. Thus, it is possible to construct an integral electromagnetic flow coupler and a heat exchanger, with the flow coupler requiring being no special electrode structure.

Figure 13:
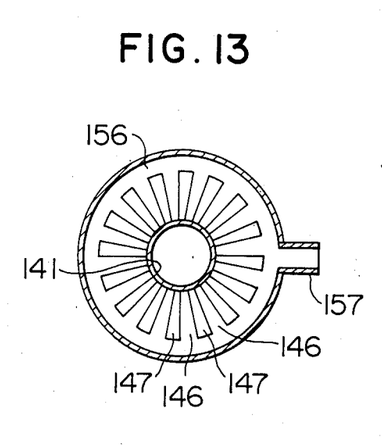
FIG. 13 is a sectional view of the heat exchanger taken along the line XIII—XIII of FIG. 11.
Figure 17:
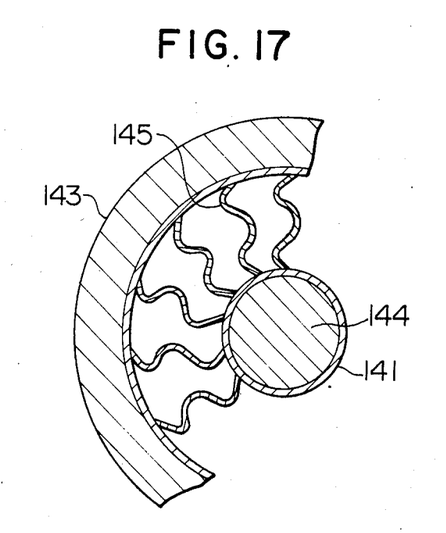
FIG. 17 is a partially fragmented sectional view of a heat exchanger of a sixth embodiment of the invention in which the fifth embodiment is modified.

A sixth embodiment shown in FIG. 17 is directed to modifying the structure of the heat transfer section of the fifth embodiment. The embodiment of FIG. 17 differs from the embodiment shown in FIGS. 11 to 13 in that the partitioning plates 145 are corrugated to enlarge the heat transfer area to not only increase the amount of heat to be exchanged but also absorb the thermal expansion due to the difference in temperature between the primary and secondary fluids. In the embodiment of FIG. 17, the functions and actions stated in connection with the preceding embodiment of FIG. 15 can be obtained.

Figure 18:
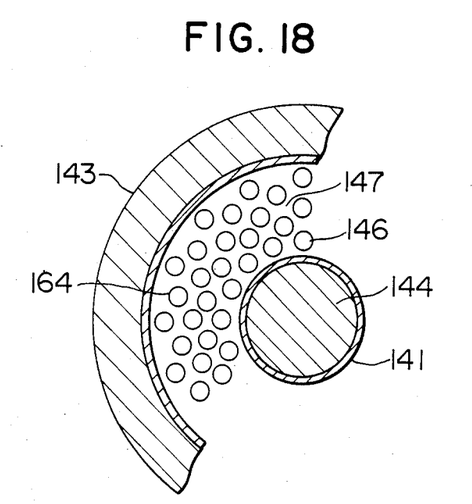
FIG. 18 is a partially fragmented sectional view of a heat exchanger of a seventh embodiment of the invention in which the fifth embodiment is modified.

A seventh embodiment shown in FIG. 18 is also directed to modifying the structure of the heat transfer section of the fifth embodiment of FIG. 15. This second modification differs from the fifth embodiment shown in FIGS. 11 to 13 in that, while the fifth embodiment of FIG. 15 uses a heat transfer wall of flat-plate type, the embodiment of FIG. 18 uses cylindrical tubes 164 as the heat transfer wall means, with the interiors of said tubes serving as the primary fluid passages 146 and the region, defined between the outer wall surface of said tubes and the inner wall surface of the outer cylinder, serving as the secondary fluid passage section 147. This modification also is intended to increase the heat transfer area to thereby increase the amount of heat to be exchanged. The structure shown in this modification becomes similar, as a whole, to that of the conventional shell-and-tube type heat exchanger. In this structure, a part of the loop current induced in the electromagnetic flow coupler structure leaks through the heat transfer tube walls, so that the useless current components not contributing to producing the pumping force increase. Thus, the factor which causes a decrease on the electromagnetic flow coupler efficiency occurs. The proportion of this current loss is determined by the ratio between the electric resistance in the heat transfer section determined from the material quality and dimension of the tube and the electric resistance in the electrically conductive fluid existing in the tube. Generally, where liquid sodium is used as the fluid, the stainless steel tubes are used as the heat transfer tubes. Assuming that a stainless steel tube respectively having outer and inner diameters are 3.8 cm and 2.8 cm, is used, the current loss is approximately 5%.

This means that the embodiment shown in FIGS. 11 to 16 and the embodiment shown in FIG. 17 are efficient constructions wherein the current loss is small.

As have been described above, in accordance with the present invention, by making the fluid passages of the heat exchanger into annularly arranged fluid passages and applying a uniform magnetic field from the outer peripheral portion toward the central portion, the respective directions of the magnetic field, electric current and fluid are theoretically in conformity with the operational principle of the electromagnetic flow coupler. Besides, in the fifth to seventh embodiments, the flows of adjacent fluids can be made opposite in direction to each other through the heat transfer wall. Therefore, it is possible not only to cause the function of an electromagnetic flow coupler over the entire heat transfer wall surface but also, since no special electrode structure is required, to obtain a heat exchanger of simple construction wherein the pumping function of primary system can be produced by the flow of fluid in the secondary system.

Particularly where the primary fluid of a nuclear reactor flows by non-mechanical pumping action based on the use of an electromagnetic flow coupler, since there is no need to provide any mechanical pump in the fluid passages for primary fluid constituted by radioactive fluid, the fluid system can be made a simple system easy to maintain and it is also possible to largely omit the electric system used in association with the pump. Further, in a nuclear reactor, in view of the importance put on the reliability of flow of fluid, it is also possible easily to prepare a nuclear reactor system also having a sub system in which a primary fluid is made to flow by a primary pump 104 so that it may flow even when a secondary pump 108 has been disabled in addition to the electromagnetic pump system.

In any one of the above-described embodiments, permanent magnet or magnets are used. However, the invention permits the use of electromagnets as means for applying magnetic field.

In any one of the above-described embodiments, the induced loop current 21 or 163 is allowed to flow in the form of a loop coaxial with the annular fluid passage as defined and increases the efficiency with which the induced current acts upon the electrically conductive fluid. This offers the effect or advantage that the induced current can, with high efficiency, be utilized as a driving current for making the fluid flow.

We claim:

1. A device for making a fluid having electrical conductivity flow, the device comprising a plurality of fluid passages annularly arranged such that electric current flows across the adjacent passages, and a magnetic field generating means for generating magnetic flux crossing said plurality of fluid passages in a radial direction, a plurality of partitioning plate means are provided for axially dividing an annular fluid passage into said plurality of fluid passages, and wherein each of said partitioning plate means have a corrugated cross section.

2. A device for making a fluid having electrical conductivity flow, the device comprising a plurality of fluid passages annularly arranged such that electric current flows across adjacent passages, and a magnetic field generating means for generating magnetic flux crossing said plurality of fluid passages in a radial direction, and wherein said magnetic field generating means comprises a magnetic material member disposed at one of a center side and an outer peripheral side of said plurality of fluid passages, and a plurality of magnets disposed at the other side, said plurality of magnets being connected in series such that the polarities of the adjacent magnets are the same.

* * * * *